United States Patent
Huebner et al.

(10) Patent No.: US 9,676,339 B2
(45) Date of Patent: Jun. 13, 2017

(54) VERSATILE TONNEAU COVER AND STORAGE SYSTEM FOR A MOTOR VEHICLE

(71) Applicant: FORD GLOBAL TECHNOLOGIES, LLC, Dearborn, MI (US)

(72) Inventors: Annette Lynn Huebner, White Lake, MI (US); Ryan Welch, Monroe, MI (US); Joshua Greiner, Detroit, MI (US); Kristin Ann Hellman, Walled Lake, MI (US); Matthew Rutman, Canton, MI (US); Vichit Chea, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 14/676,079

(22) Filed: Apr. 1, 2015

(65) Prior Publication Data
US 2016/0288720 A1    Oct. 6, 2016

(51) Int. Cl.
*B60R 5/04* (2006.01)
(52) U.S. Cl.
CPC ................... *B60R 5/045* (2013.01)
(58) Field of Classification Search
CPC ............. B60R 7/005; B60R 5/045; B60P 7/02
USPC .............................................. 296/37.8, 24.43
See application file for complete search history.

(56) References Cited

U.S. PATENT DOCUMENTS

| | | | | |
|---|---|---|---|---|
| 4,718,584 A * | 1/1988 | Schoeny | ................... | B60R 7/02 217/12 R |
| 5,538,148 A * | 7/1996 | Indyk | ........................ | B60R 7/02 211/12 |
| 5,669,537 A | 9/1997 | Saleem et al. | | |
| 6,176,535 B1 | 1/2001 | Chaloult et al. | | |
| 9,440,590 B1 * | 9/2016 | Huelke | ..................... | B60N 3/00 |
| 2011/0101736 A1* | 5/2011 | Sogame | ............... | B62D 25/087 296/203.04 |
| 2013/0200645 A1* | 8/2013 | Miller | ................... | B60P 7/0892 296/37.6 |
| 2014/0015271 A1* | 1/2014 | Demma | ..................... | B60R 5/04 296/24.44 |
| 2014/0354003 A1* | 12/2014 | Murray | ..................... | B60R 5/04 296/37.16 |
| 2015/0343953 A1* | 12/2015 | Stanczak | ................. | B60R 5/045 296/24.44 |
| 2016/0023610 A1* | 1/2016 | Valencia Cruz | .......... | B60R 7/02 296/37.16 |

FOREIGN PATENT DOCUMENTS

WO    2006032779 A1    3/2006

OTHER PUBLICATIONS

2014 Nissan Rogue's Cargo System Made for Family Life KickingTires, Jan. 2, 2015, 4 pages.
2014 Nissan Versa Note: First Drive KickingTires, Jan. 2, 2015, 5 pages.
English machine translation of WO2006032779A1.

* cited by examiner

*Primary Examiner* — Pinel Romain
(74) *Attorney, Agent, or Firm* — Vichit Chea; King & Schickli, PLLC

(57) ABSTRACT

A storage system for a motor vehicle includes a floor panel, a cargo space overlying the floor panel, a storage compartment underlying the floor panel and a versatile tonneau cover. The tonneau cover is displaceable between a storage position in the storage compartment and at least one use position in the cargo space. A shelf support is provided in the cargo space above the floor panel. In one use position, the tonneau cover rests on the shelf support forming a shelf to hold different items.

19 Claims, 18 Drawing Sheets

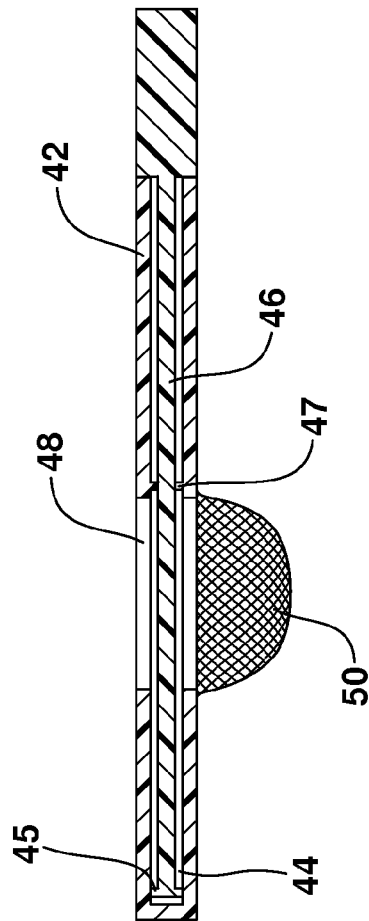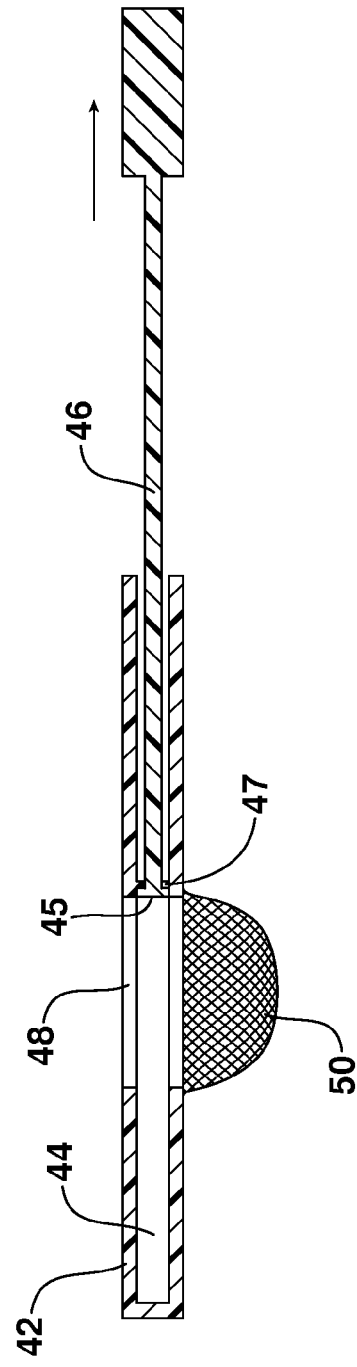

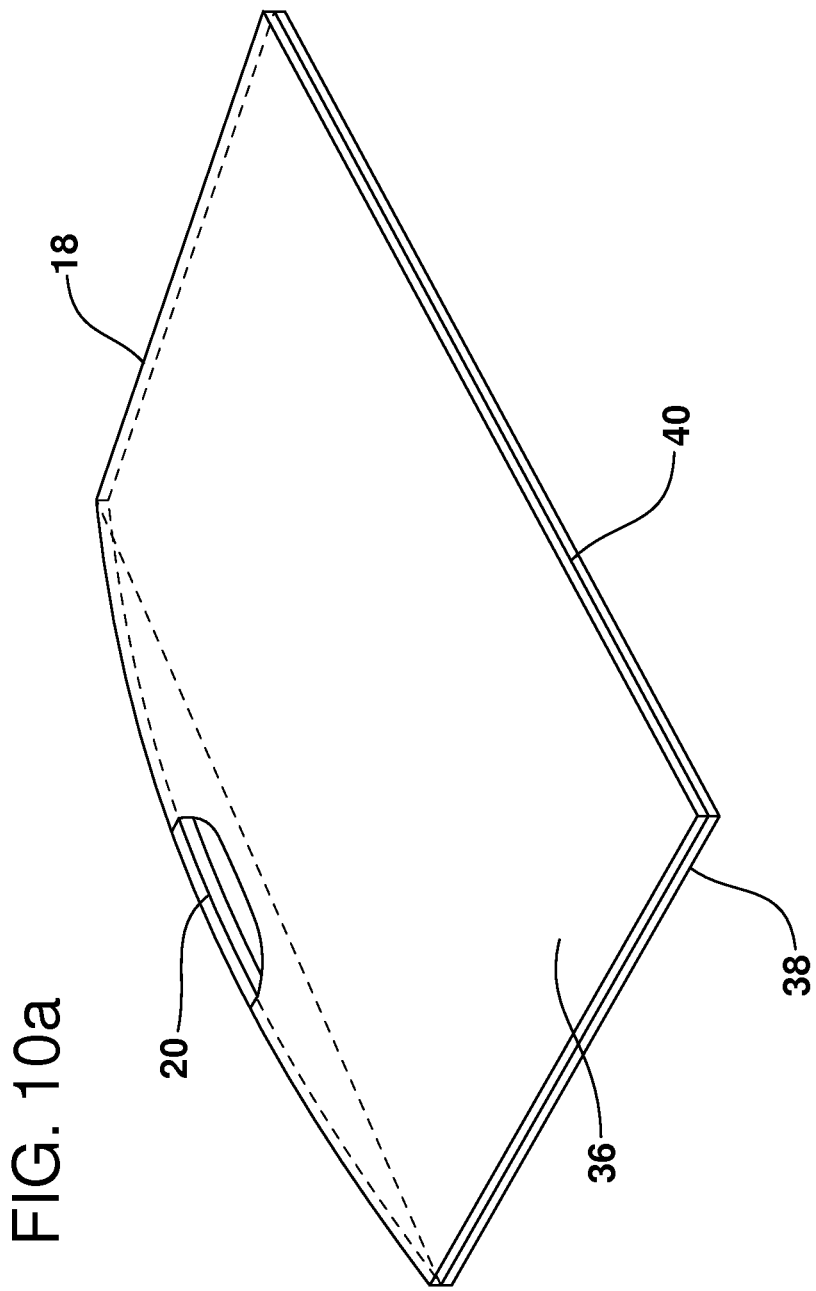

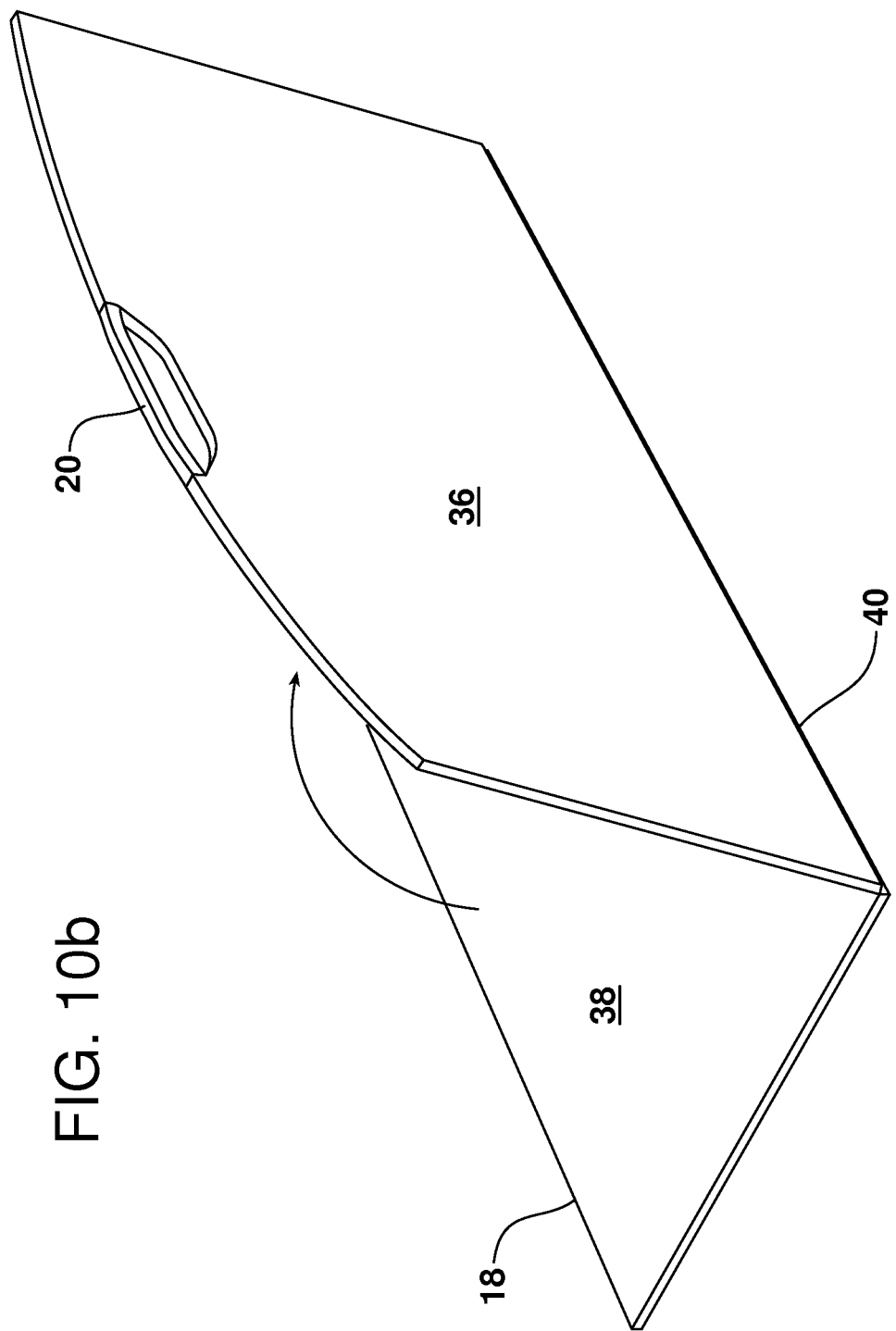

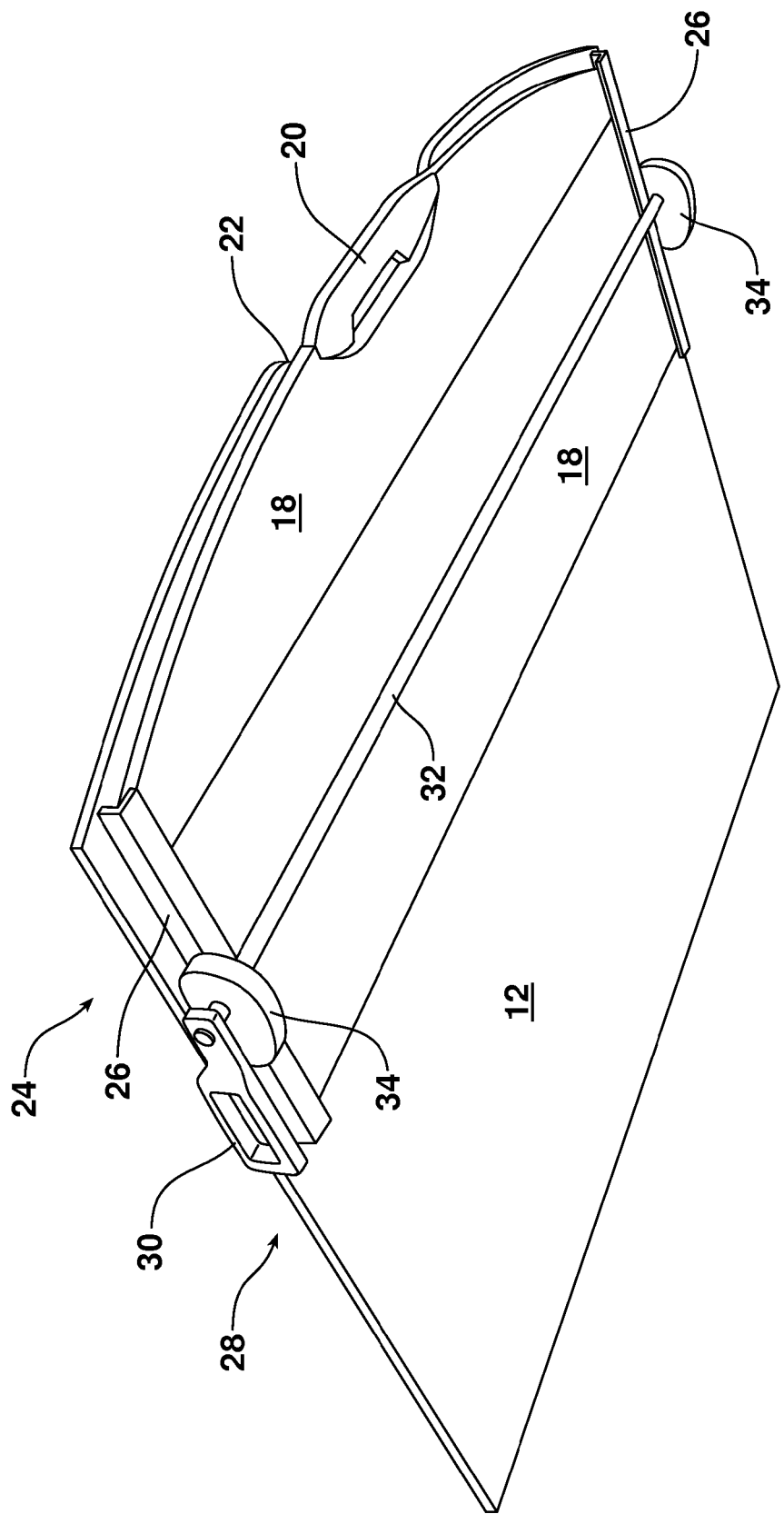

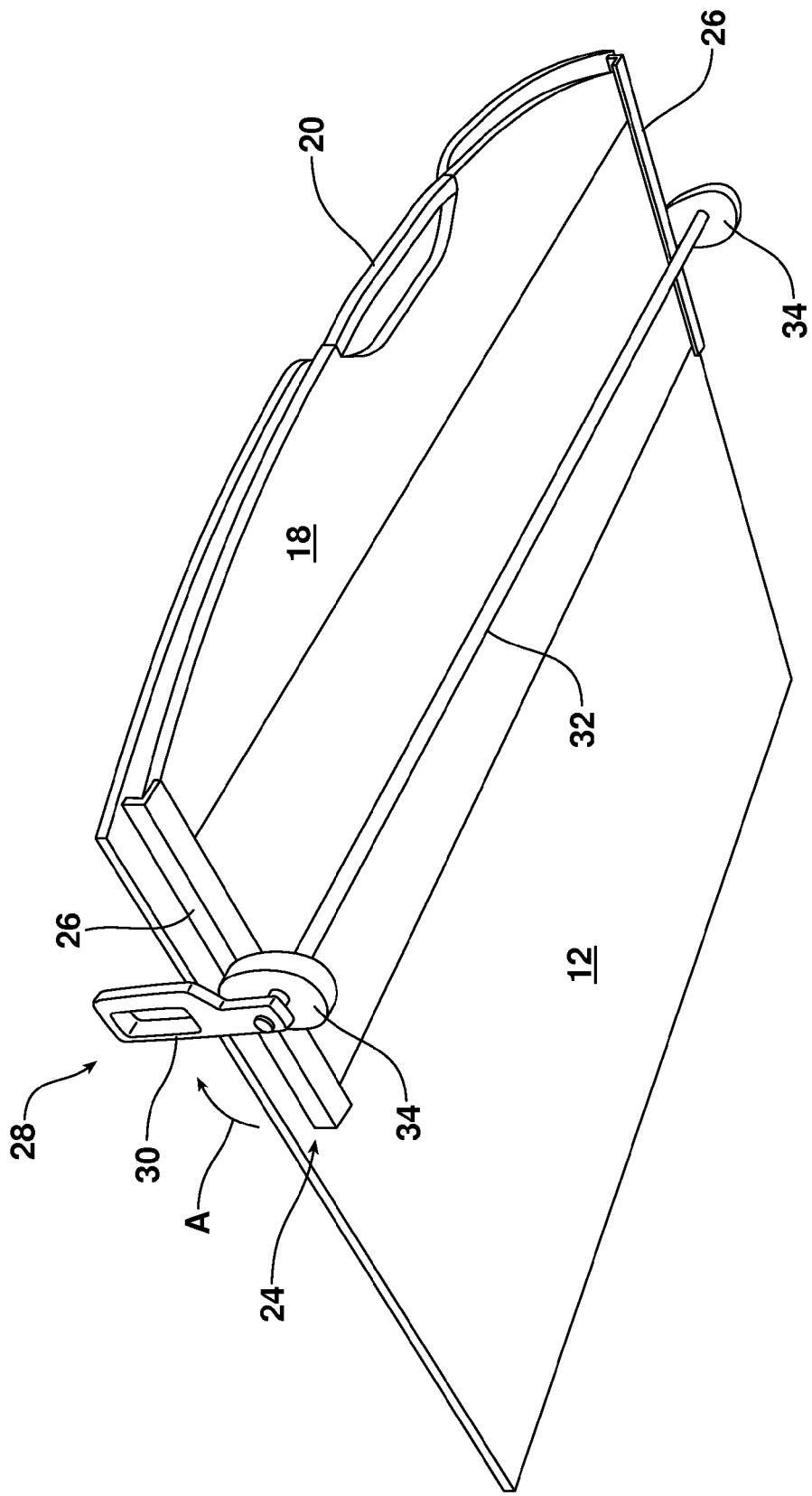

VERSATILE TONNEAU COVER AND STORAGE SYSTEM FOR A MOTOR VEHICLE

TECHNICAL FIELD

This document relates generally to the motor vehicle equipment field and, more particularly, to a versatile tonneau cover and a storage system for a motor vehicle.

BACKGROUND

The usefulness of the cargo space in SUVs, crossovers, hatchbacks and wagons may be greatly enhanced by means that separate and retain items transported in that space. The goal is to avoid potential damage to those items due to sudden shifting and movements caused by the motion of the motor vehicle including those produced under cornering forces or heavy braking. Toward this end, Ford Motor Company previously introduced a portable storage system that is disclosed and described in U.S. Pat. No. 5,669,537. That system incorporates hinged side members that may be deployed to support a removable shelf at different heights in the storage compartment.

This document relates to a new and improved storage system incorporating a versatile tonneau cover that is displaceable between a storage position in a storage compartment underlying a floor panel and multiple use positions for partitioning the cargo space above the floor panel in substantially any desired manner. Further, the storage system incorporates a unique and novel lighting system tailored to meet the changing needs of the vehicle operator based upon the manner in which the tonneau cover is utilized to partition the cargo space. Accordingly, the present storage system set forth in this document represents a significant advance in the art.

SUMMARY

In accordance with the purposes and benefits described herein, a new and improved storage system is provided for a motor vehicle. That storage system may be broadly described as comprising a floor panel, a cargo space overlying the floor panel, a storage compartment underlying the floor panel and a tonneau cover displaceable between a storage position in the storage compartment and at least one use position in the cargo space.

In one possible embodiment, the storage system further includes a shelf support in the cargo space above the floor panel. This shelf support functions to support the tonneau cover in a first use position spaced above the floor panel. In this position, the tonneau cover extends substantially parallel to the floor panel thereby forming a shelf that divides the cargo space in a horizontal plane.

In one possible embodiment, the shelf support includes a first section and a second section divided by a gap. The tonneau cover may be supported in the gap in a second use position with the tonneau cover substantially perpendicular to the floor panel. Thus, in this position, the tonneau cover functions as a vertical partition which divides the cargo space into two separate areas.

A first light source may be provided in the first section of the shelf support and a second light source may be provided in a second section of the shelf support. A first actuator switch is provided for the first light source and a second actuator switch is provided for the second light source. The first light source is activated when the tonneau cover is positioned on the first section of the shelf support. The second light source is activated when the tonneau cover is positioned on the second section of the shelf support. Both light sources are activated when the tonneau cover is positioned on both sections of the shelf support. Thus, it should be appreciated that the lighting is adapted specifically to illuminate the area under the tonneau cover, however the tonneau cover is positioned on the shelf support, in order to provide light where it is most needed by the vehicle operator.

In one possible embodiment, the tonneau cover includes a first portion and a second portion and may be selectively provided in a first, expanded configuration and a second, contracted configuration. In one possible embodiment, the first and second portions are connected together via a living hinge. Thus, in this embodiment, the first and second portions may be folded open into the expanded configuration or folded together into the contracted configuration.

In another possible embodiment, the second portion of the tonneau cover is telescopingly received within the first portion. A partition may be provided in the first portion of the tonneau cover. That partition is selectively displaceable between an undeployed position flush with or against a face of the tonneau cover and a deployed position projecting from the face of the tonneau cover. A locking hinge connects the partition to the first portion of the tonneau cover. This hinge allows the angle at which the partition projects from the tonneau cover to be adjusted as desired so that the partition provides an additional divider for the cargo space when the tonneau cover is in one of the use positions.

In another, alternative embodiment, an opening is provided in a face of the first portion of the tonneau cover and a storage net covers that opening. Thus, when the tonneau cover is positioned on the shelf support and utilized as a shelf, one may use the cargo net to store smaller items and prevent them from shifting and rolling around in the larger expanse of the cargo space.

In accordance with yet another aspect, the storage system includes a receiver for receiving and holding the tonneau cover in the storage position beneath the floor panel. In one possible embodiment, the receiver comprises two opposed channels carried on an underside of the floor panel. Further, the floor panel includes a relief opening and the tonneau cover includes a handle accessible through that relief opening when the tonneau cover is in the storage position.

Still further, the storage system may include a tilt mechanism for the floor panel. In one possible embodiment, the tilt mechanism includes a control handle and at least one rotating cam. The tilt mechanism is displaceable between a home position wherein the floor panel rests flush with a floor of the motor vehicle and a tonneau cover access position wherein the floor panel is engaged by the cam and tilted upwardly with respect to the floor. This allows one to easily slide the floor panel out of the receiver channels for deployment in one of the use positions.

In accordance with an additional aspect, a tonneau cover is provided for a motor vehicle. That tonneau cover has the necessary structural rigidity and versatility of design to function as a tonneau cover, a shelf and a partition as desired by the user. The tonneau cover includes a body having a first portion and a second portion. The second portion is telescopingly received in the first portion. Further, the body may be selectively provided in a first, expanded configuration when the second portion is extended from the first portion and a second, contracted configuration when the second portion is retracted into the first portion. In one possible embodiment, the tonneau cover further includes a partition in the first portion that is selectively displaceable between an undeployed position flush with or against a face of the tonneau cover and a deployed position projecting from the face of the tonneau cover. A locking hinge connects the partition to the first portion and allows the partition to be locked in substantially any angular orientation desired when projecting from the face of the tonneau cover. This allows one great versatility in partitioning the cargo space in a manner most effective to increase its usefulness. Further, an opening is provided in the face of the first portion of the tonneau cover and a storage net may be provided for covering that opening. This storage net provides an additional feature for holding smaller items and preventing them from shifting and moving around in the cargo space during vehicle operation.

In the following description, there are shown and described several preferred embodiments of the storage system and versatile tonneau cover. As it should be realized, the storage system and tonneau cover are capable of other, different embodiments and their several details are capable of modification in various, obvious aspects all without departing from the storage system and tonneau cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the storage system and tonneau cover and together with the description serve to explain certain principles thereof. In the drawing figures.

Figure 3:
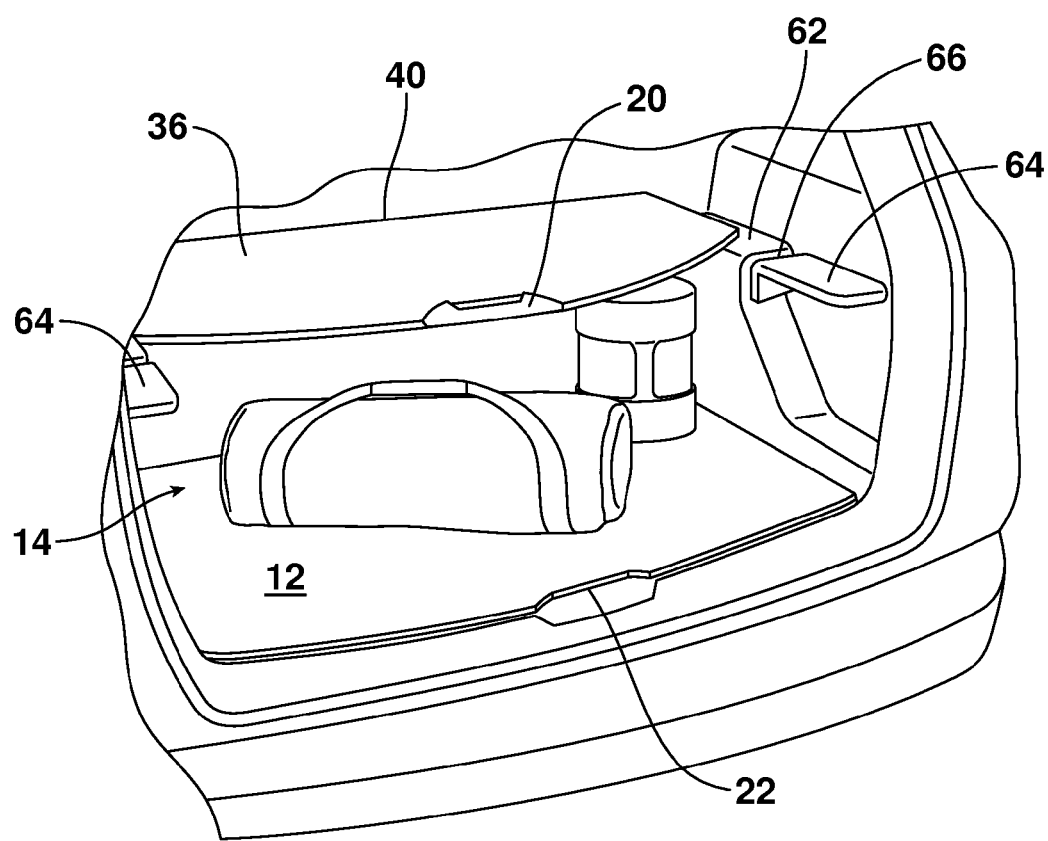

FIG. 3 discloses the tonneau cover in its contracted configuration resting on a first section of the shelf support.

Figure 4:
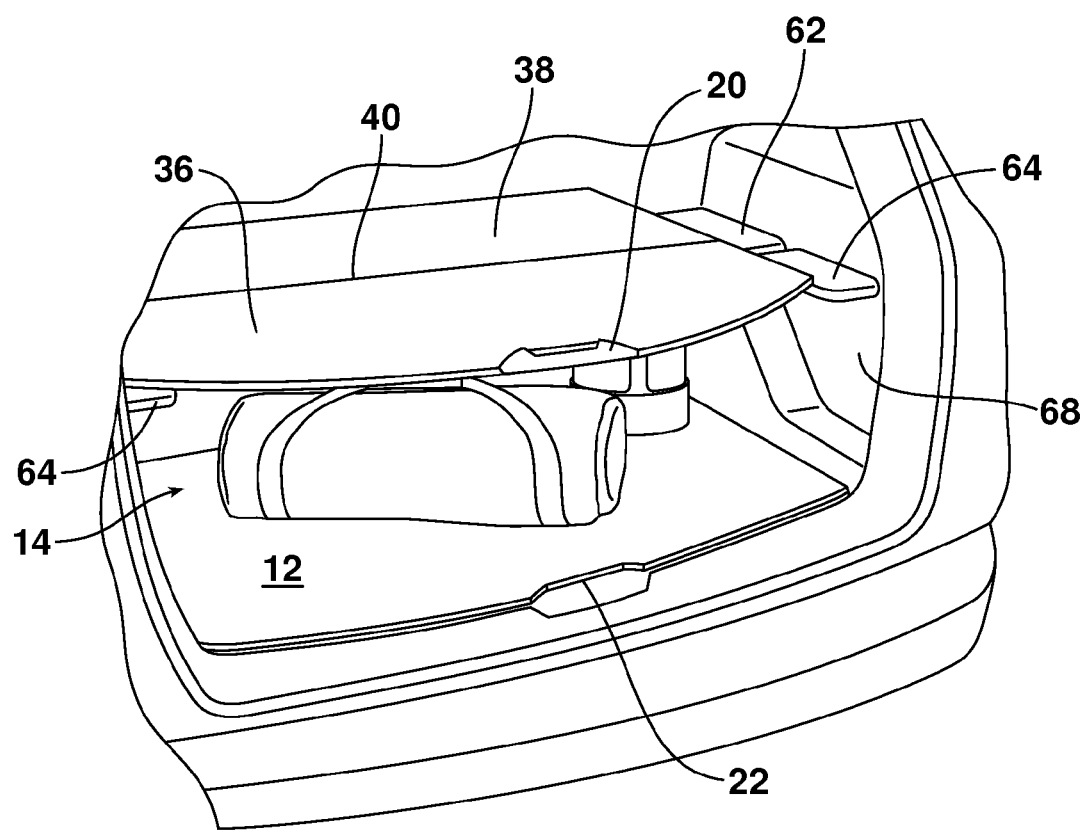

FIG. 4 is another perspective view illustrating the tonneau cover in the expanded configuration and resting on the first and second sections of the shelf support.

Figure 5:
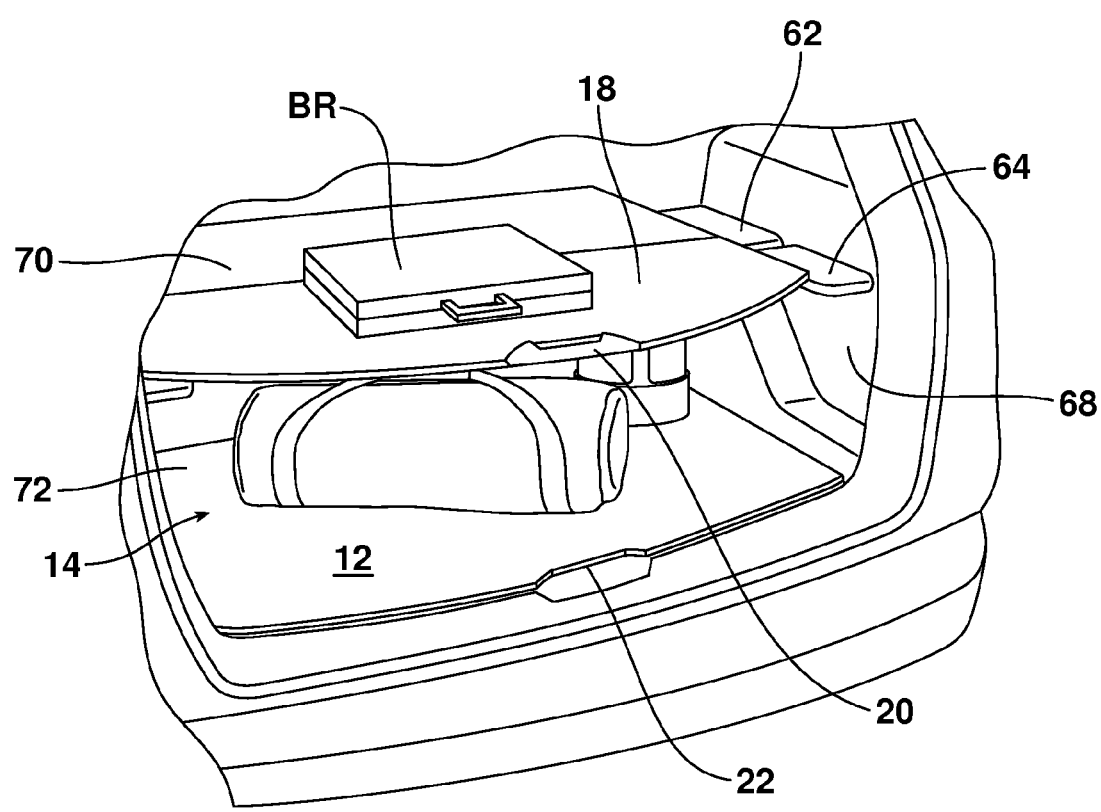

FIG. 5 is yet another perspective view illustrating how the tonneau cover may be utilized as a shelf when it is resting on the shelf support in order to support a briefcase.

Figure 6:
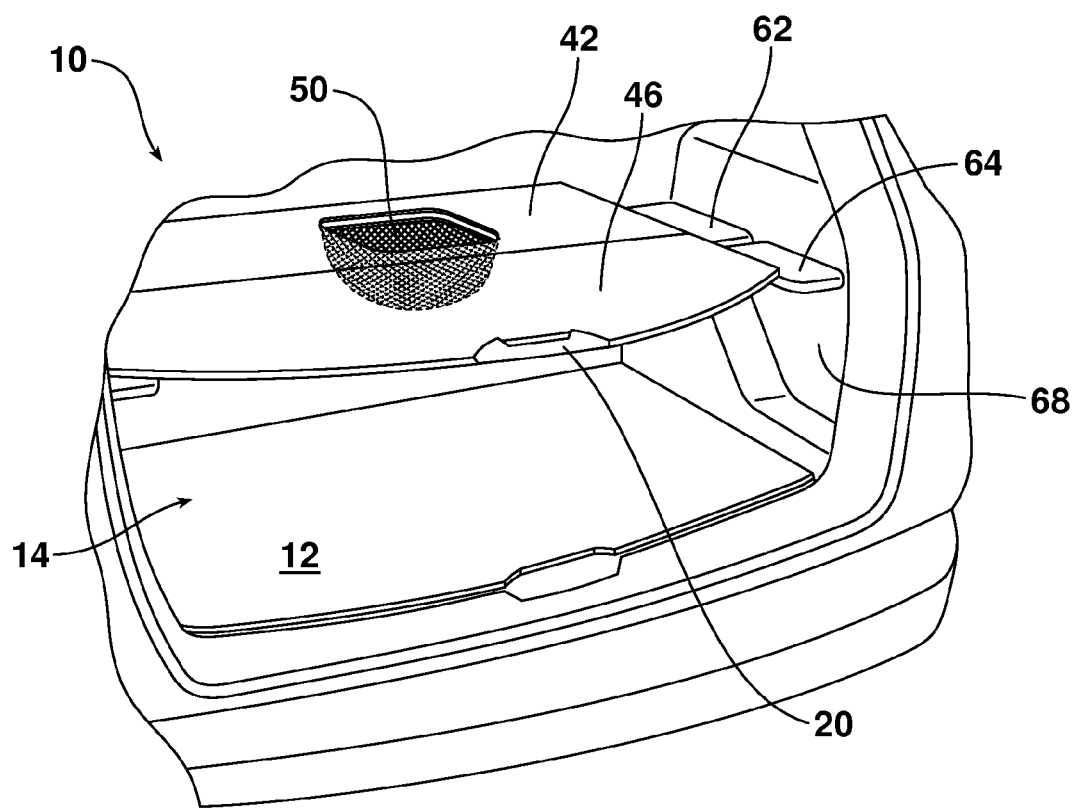

FIG. 6 is a perspective view illustrating an alternative embodiment of tonneau cover wherein the second portion is telescopingly received within the first portion. A net is also provided for holding small items to prevent them from shifting around in the storage area.

FIG. 6a is a cross-sectional view of the telescoping embodiment illustrated in FIG. 6, showing the cover in a retracted configuration so that the opening to the net is closed/covered.

FIG. 6b is a cross-sectional view similar to FIG. 6a but showing the cover in an expanded configuration with the opening to the net open so as to allow net access.

Figure 7:
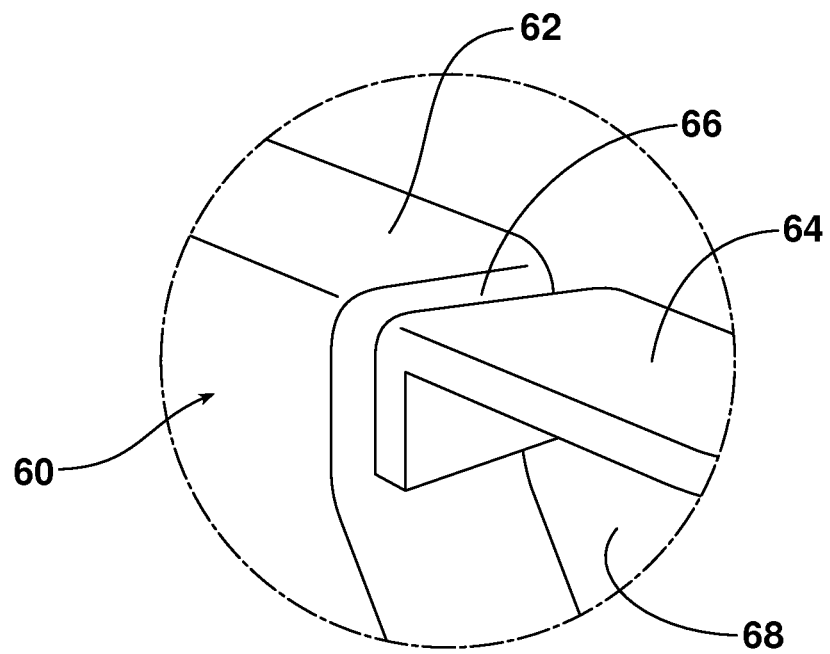

FIG. 7 is a more detailed perspective view illustrating the gap provided between the first and second sections of the shelf support on one side wall of the cargo space.

Figure 8:
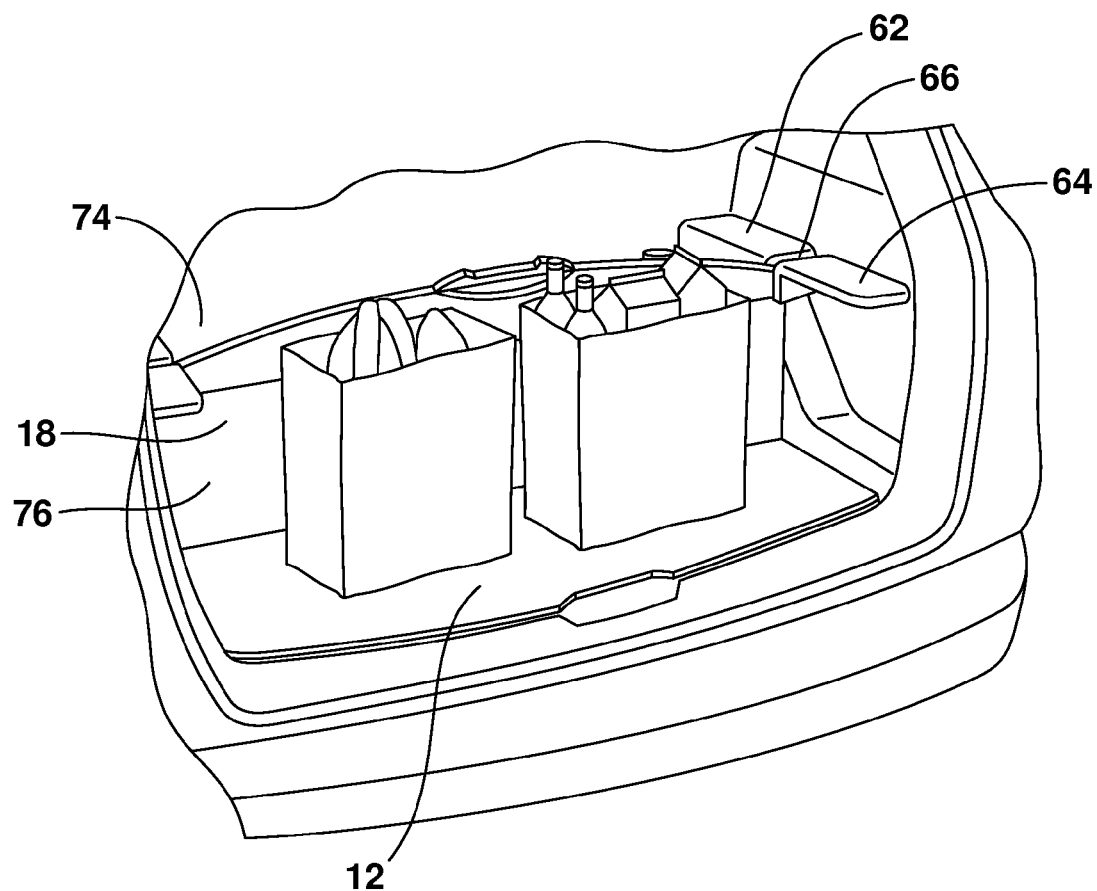

FIG. 8 is a perspective view illustrating how the tonneau cover may be positioned in that gap in order to provide a vertical partition of the cargo space.

Figure 9:
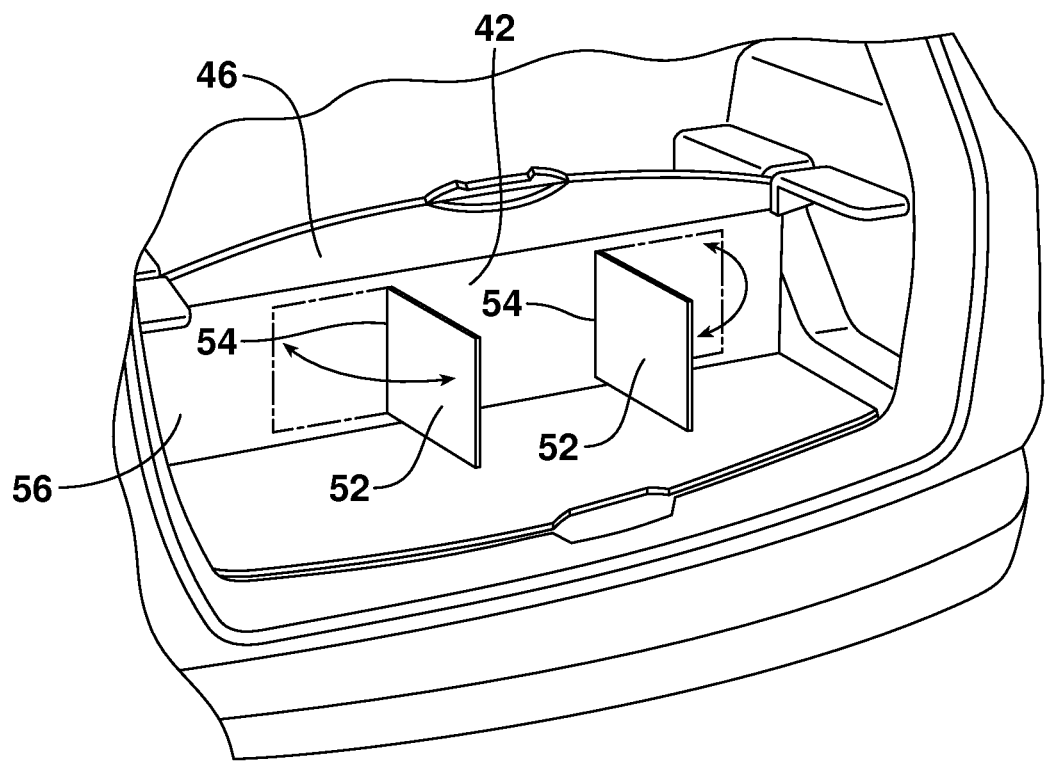

FIG. 9 is a detailed perspective view illustrating partitions provided in the first portion of the tonneau cover that may be selectively displaced to project from the tonneau cover and provide further division of the cargo space at substantially any desired angle thereby enhancing the versatility of the storage system.

Figure 10C:
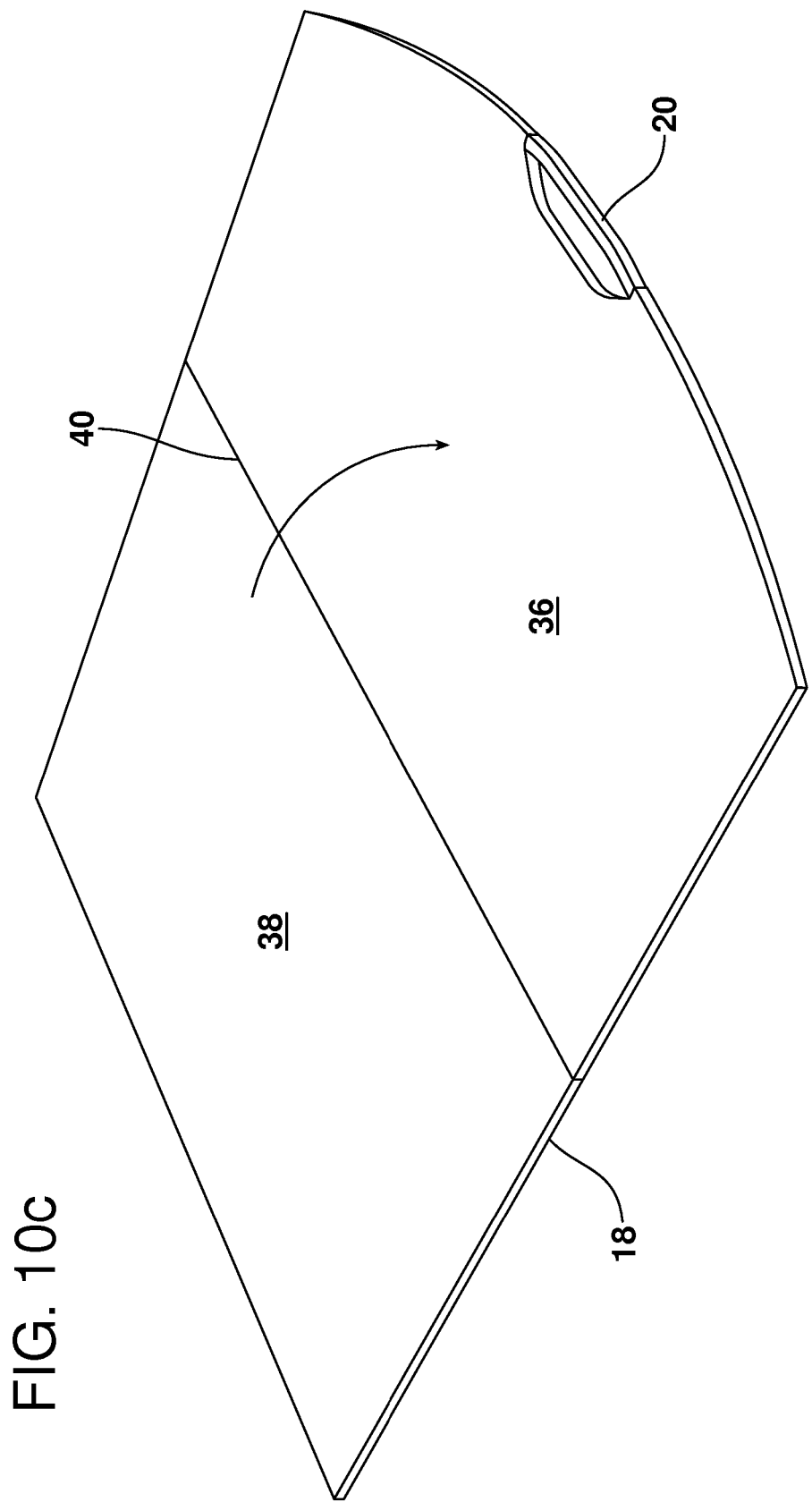

FIGS. 10a-10c illustrate in detail one embodiment of the tonneau cover incorporating two portions connected together by means of a living hinge. FIG. 10a illustrates the cover fully folded into a contracted configuration. FIG. 10b illustrates the unfolding of the tonneau cover in an intermediate position. FIG. 10c shows the complete unfolding of the tonneau cover into the flat or expanded configuration.

Figure 11C:
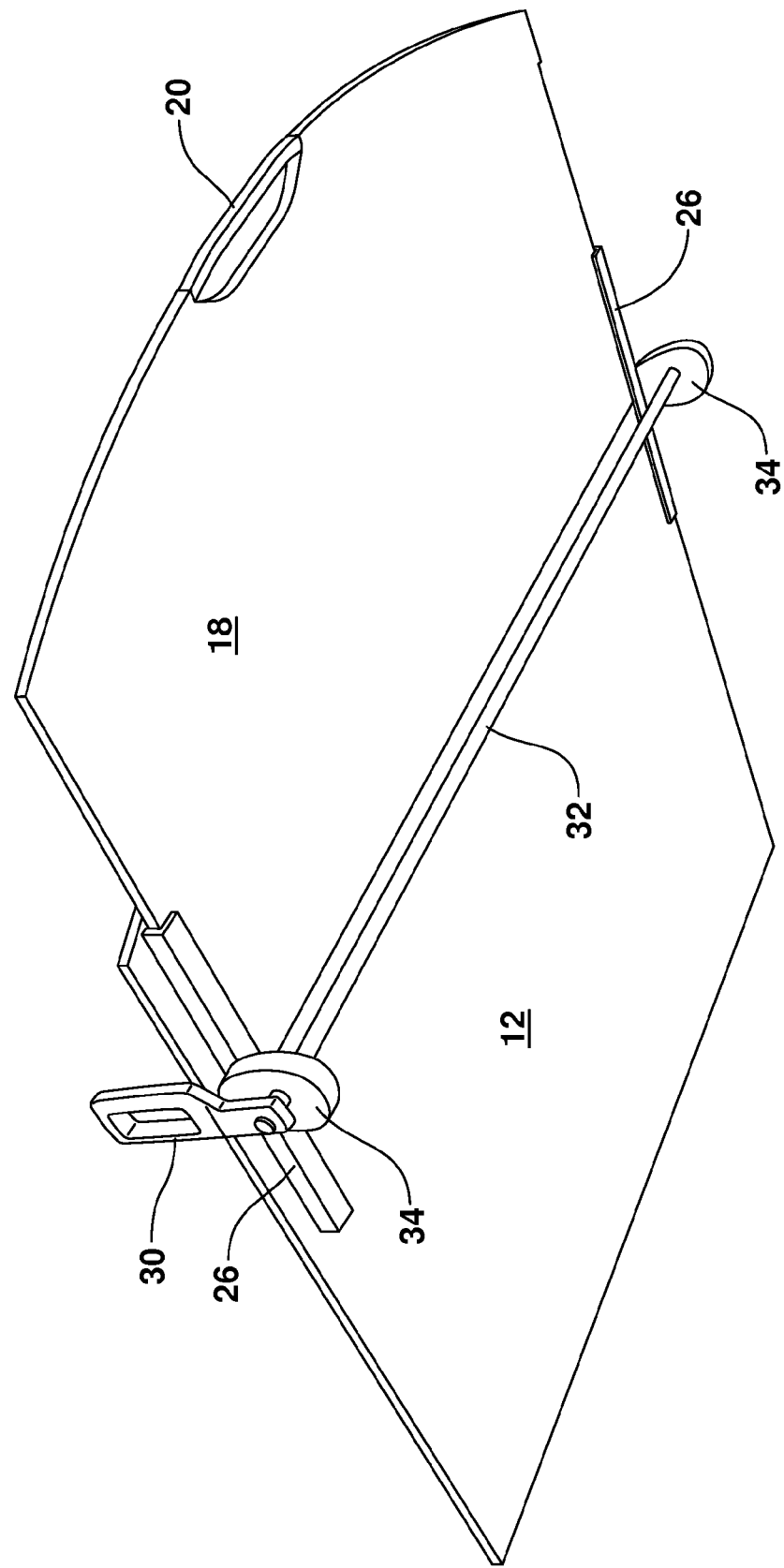

FIGS. 11a-11c are perspective views illustrating the tilt mechanism for tilting the floor panel and accessing and drawing the tonneau cover from the storage position. FIG. 11a shows the tonneau cover held in the receiver and the tilt mechanism in the home or lower position. FIG. 11b shows the tilt mechanism in the tonneau cover access position with the cams of the tilt mechanism tilting the floor panel upwardly with respect to the remaining floor of the motor vehicle. FIG. 11c shows the tonneau cover being removed from the receiver on the bottom of the floor panel.

Figure 12A:
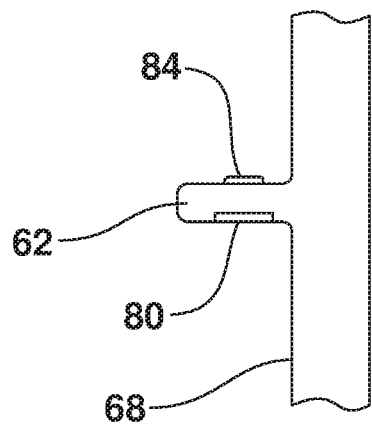
Figure 12D:
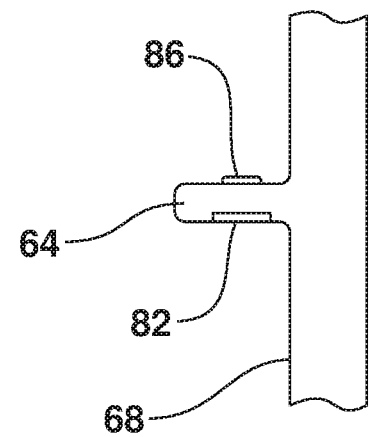
Figure 12B:
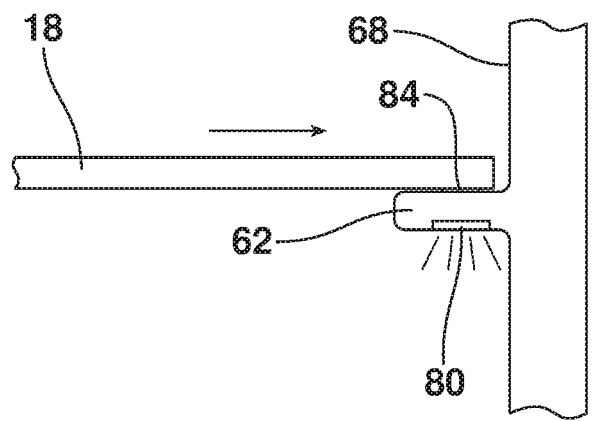
Figure 12C:
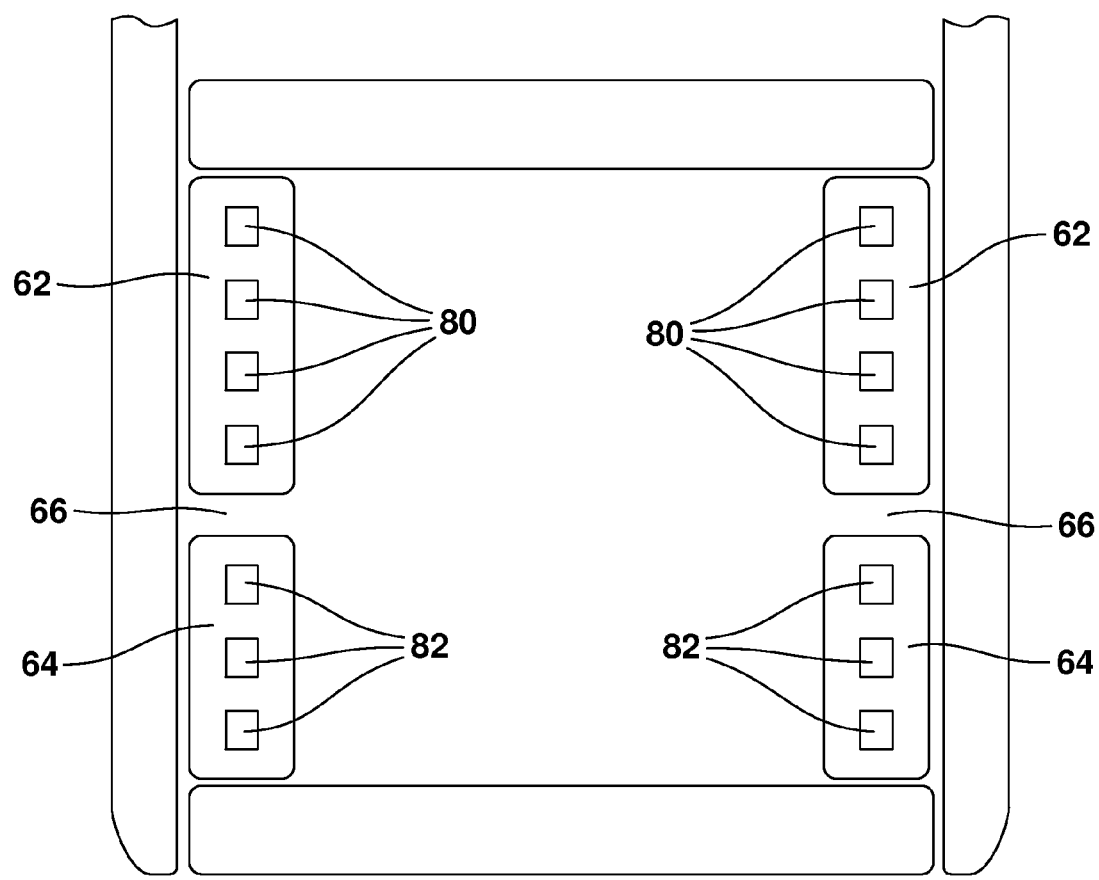

FIGS. 12a-12d are schematic illustrations of the adaptive lighting system provided as a part of the overall storage system. FIG. 12a illustrates the shelf support including an underlying light source and an overlying activation switch, while FIG. 12d illustrates the second shelf support including a second underlying light source and a second overlying activation switch. FIG. 12b illustrates the tonneau cover in position on the shelf support depressing the activation switch and activating the light source. FIG. 12c is a schematic bottom plan view illustrating the two sections of the shelf support, the gap dividing those two sections and the light sources provided on the underside of the two sections of the shelf support.

Reference will now be made in detail to the present preferred embodiments of the storage system and tonneau cover, examples of which are illustrated in the accompanying drawing figures.

DETAILED DESCRIPTION

Figure 1:
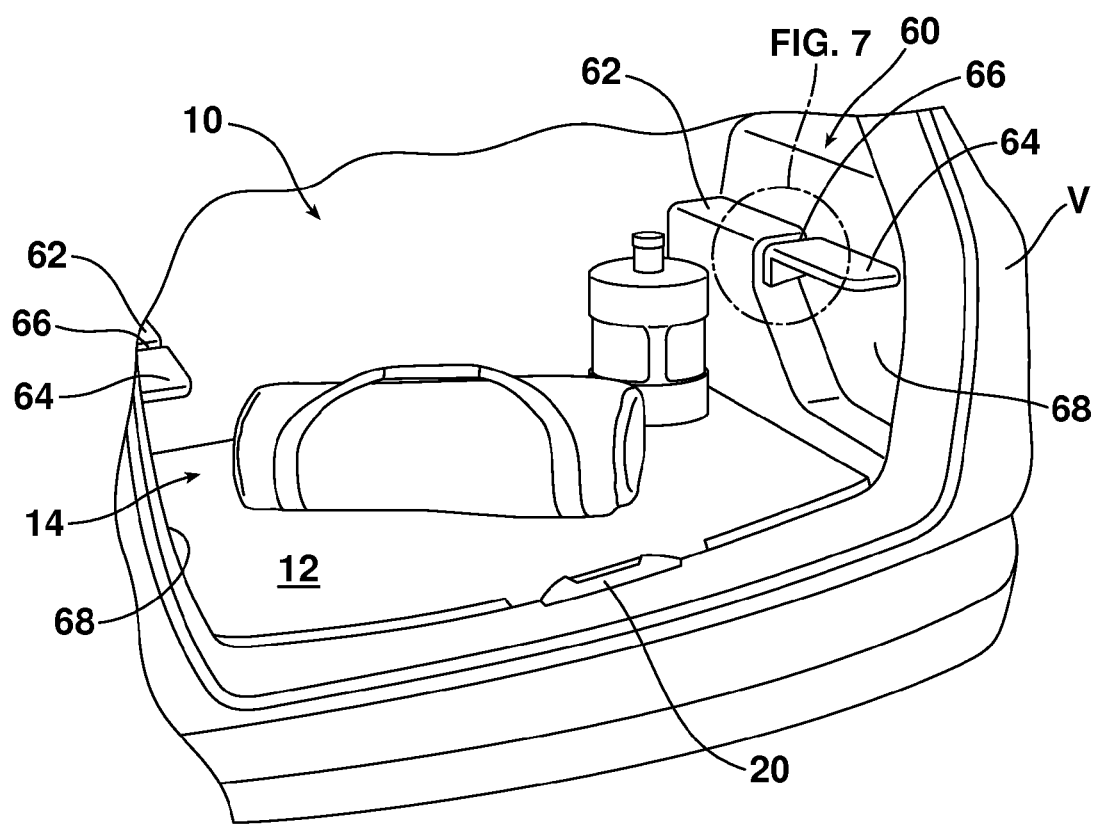
FIG. 1 is a perspective view of the storage system illustrating the tonneau cover in the storage position where it is held in a storage compartment underlying the floor panel.
Figure 2:
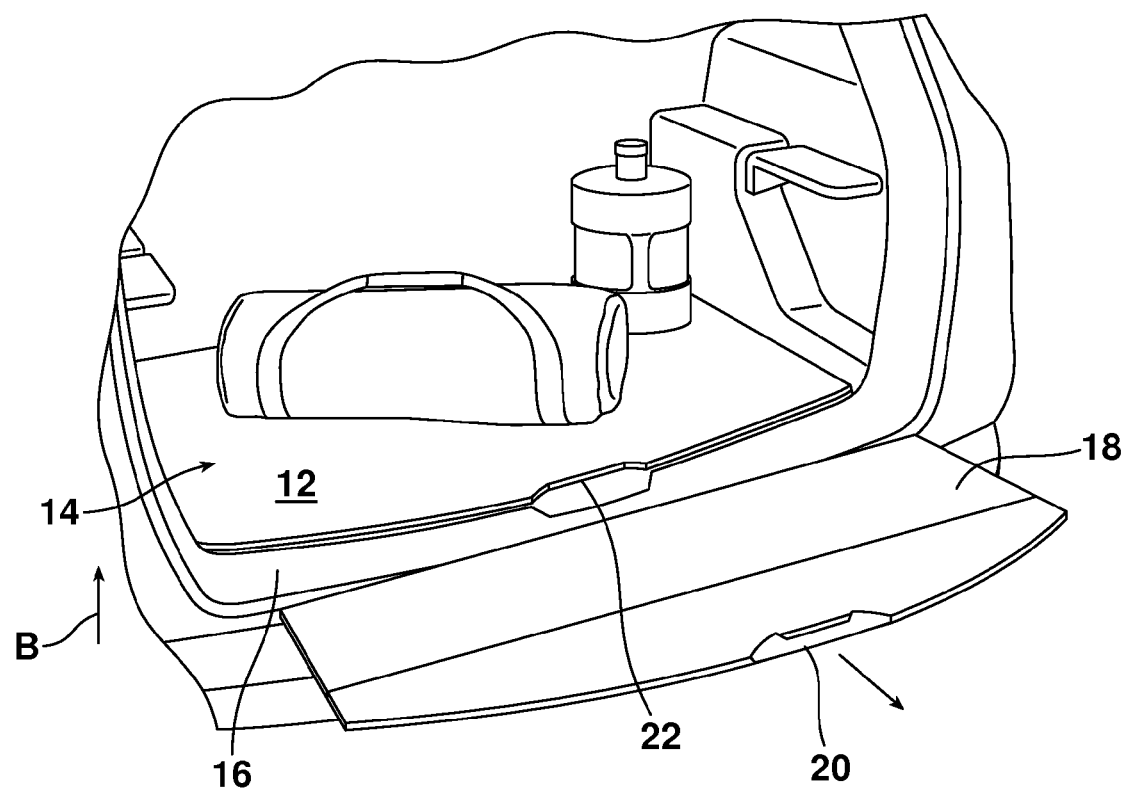
FIG. 2 is a perspective view illustrating the tonneau cover now withdrawn from the storage position in the storage compartment.

Reference is now made to the drawing figures illustrating the storage system 10 for a motor vehicle V. As illustrated in FIGS. 1 and 2, the storage system 10 may be broadly described as including a floor panel 12, a cargo space, generally designated by reference numeral 14, overlying the floor panel, a storage compartment 16 underlying the floor panel and a tonneau cover 18. The tonneau cover 18 includes a handle 20. The floor panel 12 includes a relief opening 22 to allow one to see and access the handle 20 even when the tonneau cover 18 is in the storage position. The tonneau cover 18 is displaceable between a storage position underlying the floor panel 12 within the storage compartment 16 as illustrated in FIG. 1 and various use positions in the cargo space 14 as illustrated in, for example, FIGS. 3, 4, 5 and 8.

As best illustrated in FIGS. 2 and 11a-11c, the tonneau cover 18 may be easily removed from the storage position beneath the floor panel 12. More specifically, when the tonneau cover 18 is in the storage position it is held in a receiver 24 provided on the underside of the floor panel 12. In the illustrated embodiment, that receiver 24 comprises two opposed channels 26. As illustrated in FIG. 11a, when in the storage position, the tonneau cover 18 rests in those channels 26.

A tilt mechanism 28 (see FIG. 11a-11c) connected to the floor or frame of the vehicle V allows one to easily access and remove the tonneau cover 18 from the storage position. As illustrated, the tilt mechanism 28 comprises a control handle 30 connected by the axle 32 to two cooperating eccentric cams 34 that are provided outboard of the channels 26. FIG. 11a illustrates the relative position of the control handle 30 and the cams 34 when the floor panel 12 is in the home or flat position illustrated in FIG. 1.

The tilt mechanism 28 is utilized to displace the floor panel 12 into the tonneau cover access position illustrated in FIG. 2 and FIG. 11b. More specifically, one engages the control handle 30 and rotates the control handle, axle 32 and cams 34 through 90° (see action arrow A) so that the eccentric cams 34 tilt the floor panel 12 upwardly (see action arrow B in FIG. 2). This is to allow one to easily slide of the cover 18 out of the channels 26 by means of the handle 20 (see FIGS. 2 and 11c). The tonneau cover 18 may then be placed in any one of the various use positions illustrated in FIGS. 3-5, 8 and 9.

In one possible embodiment, illustrated in FIGS. 10a-10c, the tonneau cover 18 includes a first portion 36 and a second portion 38 connected together by means of a living hinge 40. When in the storage position, the first and second portions 36, 38 of the tonneau cover 18 are folded together so that the tonneau cover assumes a contracted configuration see, for example, FIGS. 2, 11a-11c and 10a. As illustrated in FIGS. 10c, 4 and 5, the cover 18 may also be completely unfolded into an expanded or flat configuration. FIG. 10b shows the unfolding of the two portions 36, 38 in an intermediate position between the contracted configuration illustrated in FIG. 10a and the fully expanded configuration illustrated in FIG. 10c.

An alternative embodiment of tonneau cover 18 is illustrated in FIGS. 6, 6a, 6b and 9. As illustrated in these Figures, the tonneau cover 18 is of the telescoping type wherein the first portion 42 includes an interior space 44 and the second portion 46 is telescopingly received within that space in the first portion. Thus, the tonneau cover 18 is displaceable between a contracted configuration illustrated in FIG. 6a and an expanded configuration illustrated in FIG. 6b. As further illustrated in FIGS. 6, 6a and 6b in one possible embodiment, an opening 48 is provided in the first portion 42. When in the contracted position of FIG. 6a, the second portion 46 closes that opening 48. However, when in the expanded position of FIG. 6b, the second portion 46 is withdrawn from the space 44 and the opening 48 is opened allowing access to the storage net 50 covering the opening. Thus, when the tonneau cover 18 of this embodiment is oriented in a horizontal position as a shelf and is in the expanded configuration, one may place small items in the storage net 50 through the opening 48 where they may conveniently be held for access. If desired, the tonneau cover 18 may then be the displaced into the contracted configuration with the second portion 46 closing the opening 48 and capturing those items in storage net 50. A stop 45 at the end of the second portion 46 abuts the lugs 47 on the first portion 42 at the fully expanded position.

In yet another alternative embodiment illustrated in FIG. 9, the tonneau cover may include one or more partitions 52 that are connected by means of locking hinges 54 to a face 56 of the first portion 42. In an undeployed position, the partitions 52 may rest against or be flush with the face 56. When deployed, the partitions 52 may be positioned to project from the face at a number of different, desired angles where they are locked by the hinges 54. As should be appreciated, these partitions 52 allow the cargo space 14 to be divided up or partitioned in a number of different ways as best suited by the user to suit the cargo space to the user's needs when transporting different items.

As further illustrated in FIGS. 1-5, 7-9 and 12a-12d, the storage system 10 also includes a shelf support generally designated by reference number 60. Shelf support 60 includes a first section 62 and a second section 64 divided by a gap 66. As illustrated in FIG. 3, when the tonneau cover 18 is in the contracted configuration, it may be position to rest upon the first section 62 of the shelf support 60 which extends along each side wall 68 of the cargo space 14. Alternatively, as illustrated in FIG. 4, the tonneau cover 18 may be provided in the expanded configuration and rested in a second use position on both the first and second section 62, 64 of the shelf support 60. Here it should be appreciated that the tonneau cover 18 has sufficient structural rigidity to function as a shelf to hold a briefcase BR (FIG. 5) or the like. Thus, as illustrated in FIG. 5, the tonneau cover 18 may be disposed substantially horizontally, spaced from and parallel to the floor panel 12 on the shelf support 60 and thereby partition the cargo space 14 into an upper section 70 and a lower section 72. Alternatively, as best illustrated in FIGS. 7 and 8, the tonneau cover 18 may be provided in the contracted configuration and inserted into the gap 66 between the first and second section 62, 64 in order to function as a vertically oriented partition dividing the cargo space 14 into a forward section 74 and a rearward section 76. See also FIG. 9 showing how the partitions 52 may then be used to further divide the rearward section 76 as desired.

Reference is now made to FIGS. 12a-12d illustrating yet another aspect of the storage system 10. As illustrated, a first light source 80 may be provided on the underside of the first shelf support section 62 while a second light source 82 may be provided on the underside of the second shelf support section 64. Similarly, a first actuator switch 84 is provided on the top face of the first shelf support section 62 while a second actuator switch 86 is provided on a top face of the second shelf support section 64. The actuator switches 84, 86 may comprise, for example, micro switches within the shelf support 60, proximity sensor switches between the cover 18 and the shelf support 60 or magnet switches. As illustrated in FIG. 12b, when the tonneau cover 18 is positioned on either section 62 or 64 of the shelf support 60, the associated switch 84 is triggered and the associated light source 80, 82 is activated thereby lighting the area of the cargo space 14 underlying the cover 18. Thus, when the tonneau cover 18 is in the contracted configuration and positioned on the first section 62 of the shelf support 60, the first actuator switch 84 is triggered and the first light source 80 is energized. In the event the cover 18 in the contracted configuration is positioned on the second section 64 of the shelf support 60, it is the second light source 82, not the first light source 80, that is activated. In contrast, if the tonneau cover 18 is in the expanded configuration and is positioned on and supported by both of the first and second sections 62, 64 of the shelf support 60, then both switches 84, 86 are triggered and both light sources 80, 82 are activated. Thus, it should be appreciated that the storage system 10 incorporates an adaptive lighting system that provides light where needed beneath the tonneau cover 18 no matter where the tonneau cover is positioned on the shelf support 60 thereby providing illumination to the covered area of the cargo space 14 for the visual benefit of the vehicle operator.

In summary, the storage system 10 that is the subject matter of this document provides a number of substantial benefits. The storage system 10 includes a versatile tonneau cover 18 that may be configured in expanded and contracted configurations and positioned in various use positions to partition or divide the cargo space 14 into a number of useful configurations adapted to suit the changing needs of the vehicle operator depending upon the cargo being transported. Advantageously, the tonneau cover 18 has sufficient rigidity to function as a shelf if desired. Further, in various embodiments it may include a storage net 50 and adjustable projecting partitions 52 to further divide the storage compartment 14 in the manner most useful for the vehicle operator.

In addition, the storage system 10 includes an adaptive lighting system including the light sources 80, 82 on the underside of the first and second section 62, 64 of the shelf support 60. These light sources 80, 82 operate independently to provide lighting of the cargo space 14 underneath the tonneau cover 18 to aid the vehicle operator in seeing objects under the cover. When the tailgate of the vehicle is closed, these light sources 80, 82 may be extinguished in the manner of the dome light commonly provided in motor vehicles.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A storage system for a motor vehicle, comprising:
a floor panel;
a cargo space overlying said floor panel;
a storage compartment underlying said floor panel; and
a tonneau cover displaceable between a storage position in said storage compartment and at least one use position in said cargo space.

2. The system of claim 1, further including a shelf support in said cargo space above said floor panel for supporting said tonneau cover in a first use position spaced above said floor panel.

3. The system of claim 2, wherein said shelf support includes a first section and a second section divided by a gap.

4. The system of claim 3, wherein said tonneau cover is supported in said gap in a second use position with said tonneau cover substantially perpendicular to said floor panel.

5. The system of claim 3, further including a first light source on said first section of said shelf support and a second light source on a second section of said shelf support.

6. The system of claim 5, further including a first actuator switch for said first light source and a second actuator switch for said second light source whereby said first light source is activated when said tonneau cover is positioned on said first section of said shelf support and said second light source is activated when said tonneau cover is positioned on said second section of said shelf support.

7. The system of claim 6, wherein said tonneau cover includes a first portion and a second portion and may be selectively provided in a first, expanded configuration and a second, contracted configuration.

8. The system of claim 7, wherein said first portion and said second portion are connected together via a living hinge.

9. The system of claim 7, wherein said second portion is telescopingly received within said first portion.

10. The system of claim 9, further including a partition in said first portion of said tonneau cover that is selectively displaceable between an undeployed position flush with or against a face of said tonneau cover and a deployed position projecting from said face of said tonneau cover.

11. The system of claim 10, further including a locking hinge connecting said partition to said first portion of said tonneau cover.

12. The system of claim 9, further including an opening in a face of said first portion of said tonneau cover and a storage net covering said opening.

13. A storage system for a motor vehicle, comprising:
a floor panel;
a cargo space overlying said floor panel;
a storage compartment underlying said floor panel;
a tonneau cover displaceable between a storage position in said storage compartment and at least one use position in said cargo space; and
a receiver for receiving and holding said tonneau cover in said storage position beneath said floor panel.

14. The system of claim 13, wherein said receiver comprises two opposed channels carried on an underside of said floor panel.

15. The system of claim 14, wherein said floor panel includes a relief opening and said tonneau cover includes a handle accessible through said relief opening when said tonneau cover is in said storage position.

16. The system of claim 15, further including a tilt mechanism for said floor panel, said tilt mechanism including a control handle and at least one rotating cam, said tilt mechanism being displaceable between a home position and a tonneau cover access position wherein said floor panel is tilted upwardly.

17. A tonneau cover for a motor vehicle, comprising:
a body having a first portion and a second portion wherein said second portion is telescopingly received within said first portion and said body may be selectively provided in a first, expanded configuration wherein said second portion is extended from said first portion and a second, contracted configuration wherein said second portion is retracted into said first portion; and
an opening in a face of said first portion and a storage net covering said opening.

18. The tonneau cover of claim 17, including a partition in said first portion that is selectively displaceable between an undeployed position flush with or against a face of said tonneau cover and a deployed position projecting from said face of said tonneau cover.

19. The tonneau cover of claim 18, further including a locking hinge connecting said partition to said first portion.

* * * * *